US011300738B2

(12) United States Patent
Leigh et al.

(10) Patent No.: US 11,300,738 B2
(45) Date of Patent: Apr. 12, 2022

(54) CONNECTOR ASSEMBLY INCLUDING A HOUSING-ATTACHABLE OPTICAL CONNECTOR (71) Applicant: HEWLETT PACKARD ENTERPRISE DEVELOPMENT LP, Houston, TX (US)

(72) Inventors: Kevin B. Leigh, Houston, TX (US); John Norton, Houston, TX (US); Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 426 days.

(21) Appl. No.: 16/184,462

(22) Filed: Nov. 8, 2018

(65) Prior Publication Data

US 2020/0150364 A1 May 14, 2020

(51) Int. Cl.
*G02B 6/42* (2006.01)
(52) U.S. Cl.
CPC .......... *G02B 6/4261* (2013.01); *G02B 6/428* (2013.01); *G02B 6/4284* (2013.01); *G02B 6/4292* (2013.01)
(58) Field of Classification Search
None
See application file for complete search history.

(56) References Cited

U.S. PATENT DOCUMENTS

| 6,234,817 | B1 | 5/2001 | Hwang |
| 6,267,606 | B1 | 7/2001 | Poplawski et al. |
| 6,821,027 | B2 | 11/2004 | Lee et al. |
| 7,074,084 | B2 | 7/2006 | Shuey |
| 7,695,298 | B2 | 4/2010 | Arndt |
| 9,614,325 | B2 | 4/2017 | Yuan |
| 9,835,803 | B2 | 12/2017 | Leigh et al. |
| 2002/0110336 | A1 | 8/2002 | Dair et al. |
| 2013/0064498 | A1 | 3/2013 | Chou |
| 2013/0156386 | A1* | 6/2013 | Miller .................. G02B 6/4293 385/93 |
| 2014/0064676 | A1 | 3/2014 | McColloch |
| 2015/0180578 | A1* | 6/2015 | Leigh .................. G02B 6/4293 398/135 |

OTHER PUBLICATIONS

R.J. Pimpinella, "A New Type of Fiber Optic Connector Designed for Military Optical Backplanes," May 18-20, 1992, <https://ieeexplore.ieee.org/document/204271>.

\* cited by examiner

*Primary Examiner* — Chad H Smith
(74) *Attorney, Agent, or Firm* — Nolte Lackenbach Siegel (57) ABSTRACT

A housing-attachable (HA) optical connector is removably attached to a housing that is initially designed for an electrical interface with a base electrical connector on a system board. An optical fiber terminates at one end to a chip optical connector and terminates at another end to the HA optical connector. The HA optical connector is positioned with respect to the housing such that when a portion of the printed circuit board of a removable module extending outside the housing comes into contact with a base electrical connector on a system board, the HA optical connector blind mates with a base-attachable (BA) optical connector on the system board. In this manner, electrical connectivity and optical connectivity are provided between the removable module and the system board.

20 Claims, 11 Drawing Sheets

CONNECTOR ASSEMBLY INCLUDING A HOUSING-ATTACHABLE OPTICAL CONNECTOR

BACKGROUND

Electronic components are electronically connected via electrical connections to allow for communication of electrical signals between the electronic components. Electronic components can also be optically connected to each other via optical connections to allow for communication of optical signals between the electronic components. For some applications, optical connections provide for greater bandwidth at longer reach with lower power usage and within less space than electrical connections.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A system (such as an enterprise network, a server, etc.) can include components that have connectors to establish communications with other components via a system board. A connector can be used to communicatively couple electronic components such as processors, memory devices, input/output devices, circuit boards, and so forth to a system board. A system board can refer to a structure via which components of the system are connected to other components of the system. A circuit board can refer to a structure on which components can be mounted, where the structure can include communication channels (electrical traces, optical channels, and so forth) to allow for communication among the components Connectors may be electrical connectors that have electrical contacts to allow components to communicate electrical signals and/or power. Additionally, connectors may be optical connectors that allow for optical communications between components and the system board. Examples of electrical connectors include, but are not limited to, an optical chip socket, edge finger contacts, and right-angle electrical connectors.

The presence of both electrical and optical connectors can lead to various issues. For example, mounting both electrical and optical connectors on a circuit board and a system board can occupy valuable space on the circuit board or the system board. Also, providing both optical and electrical connectors in a system can lead to complexities associated with installing components in the system.

While some connector assemblies have been proposed for including optical connectors and electrical connectors to connect a circuit board to a system board, such connector assemblies are inflexible in that the optical connectors are not easily attachable such as they can be retrofitted to systems having only electrical connectors. Also, the optical connectors typically depend on the size and type of the electrical connector.

In accordance with illustrative examples, removably attachable optical connectors are employed to promote flexibility and ease of installing components in a system in which both electrical and optical communications are used. The removably attachable optical connectors may be easily retrofitted to existing systems having electrical connectors.

According to illustrative examples, a connector assembly of a removable device includes a housing that covers at least a portion of an electrical connector such as an edge-finger connector. An edge-finger connector is a portion of a printed circuit board having electrical contacts to mate with a corresponding slot connector where the electrical contacts are electrically coupled to electronic components disposed on the printed circuit board. An array of optical fibers has a first optical connector at a first end that is removably attachable to the housing and positioned when attached to the housing so as to blind mate with a base optical connector. The optical fiber has a second optical connector at a second end of the optical fiber that mates with an optical socket that may encapsulate opto-electronic components, where the opto-electronic components may be electrically coupled to electronic components on a printed circuit board.

In this manner, electrical connectivity is provided between the printed circuit board and the system board. The optical signals go neither on the printed circuit board nor the system board. Rather, the optical signals go to opto-electronic chips disposed on the printed circuit board and either another set of opto-electronic chips on the system board, or to other optical connectors in the system. Either way, the optical connectors are not dependent on the size or type of the electrical connectors.

Figure 1A:
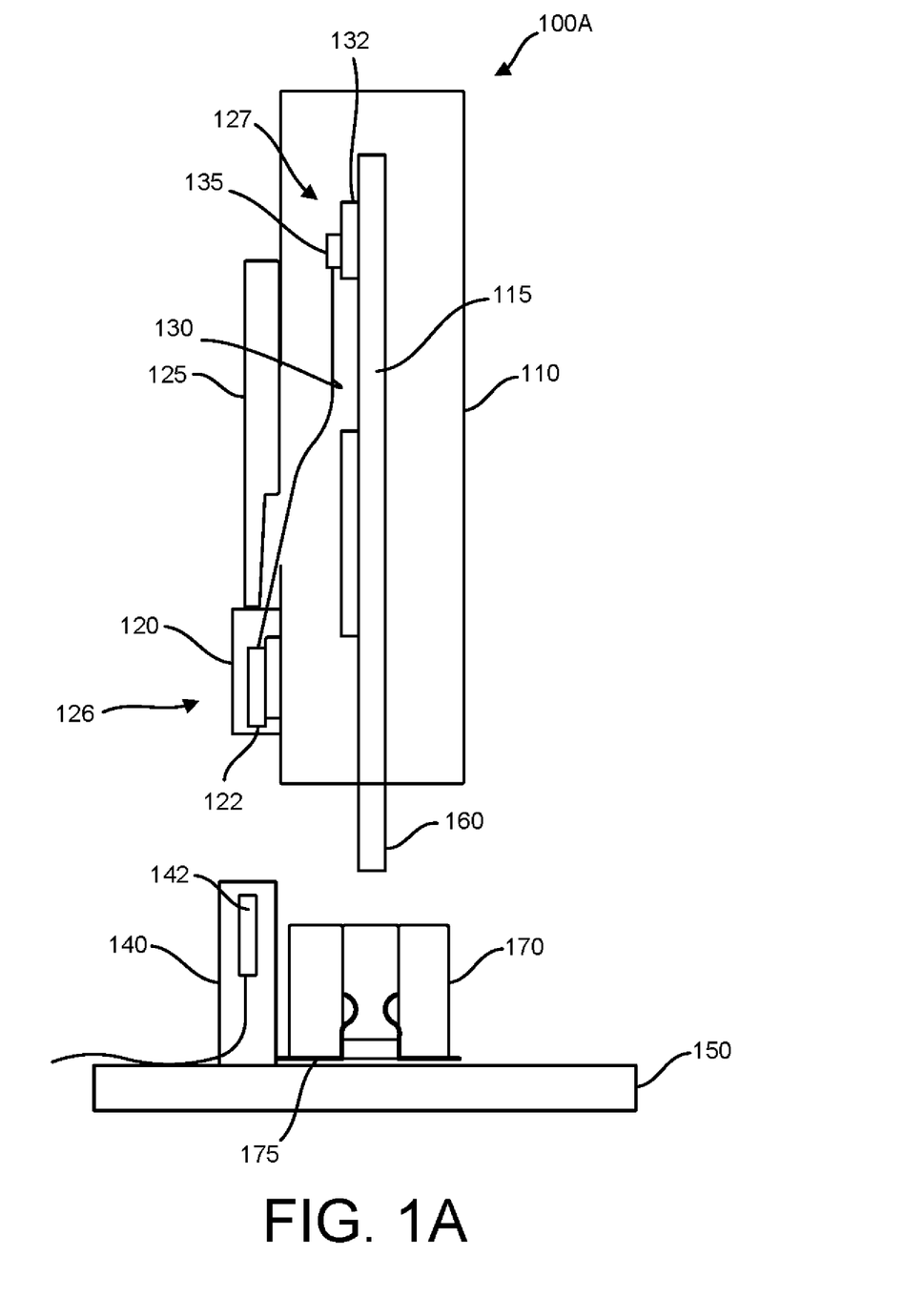
FIG. 1A is a side view of a system with a connector assembly including an optical jumper providing optical connectivity and a printed circuit board edge finger contact providing electrical connectivity according to one or more examples of the disclosure.
Figure 1B:
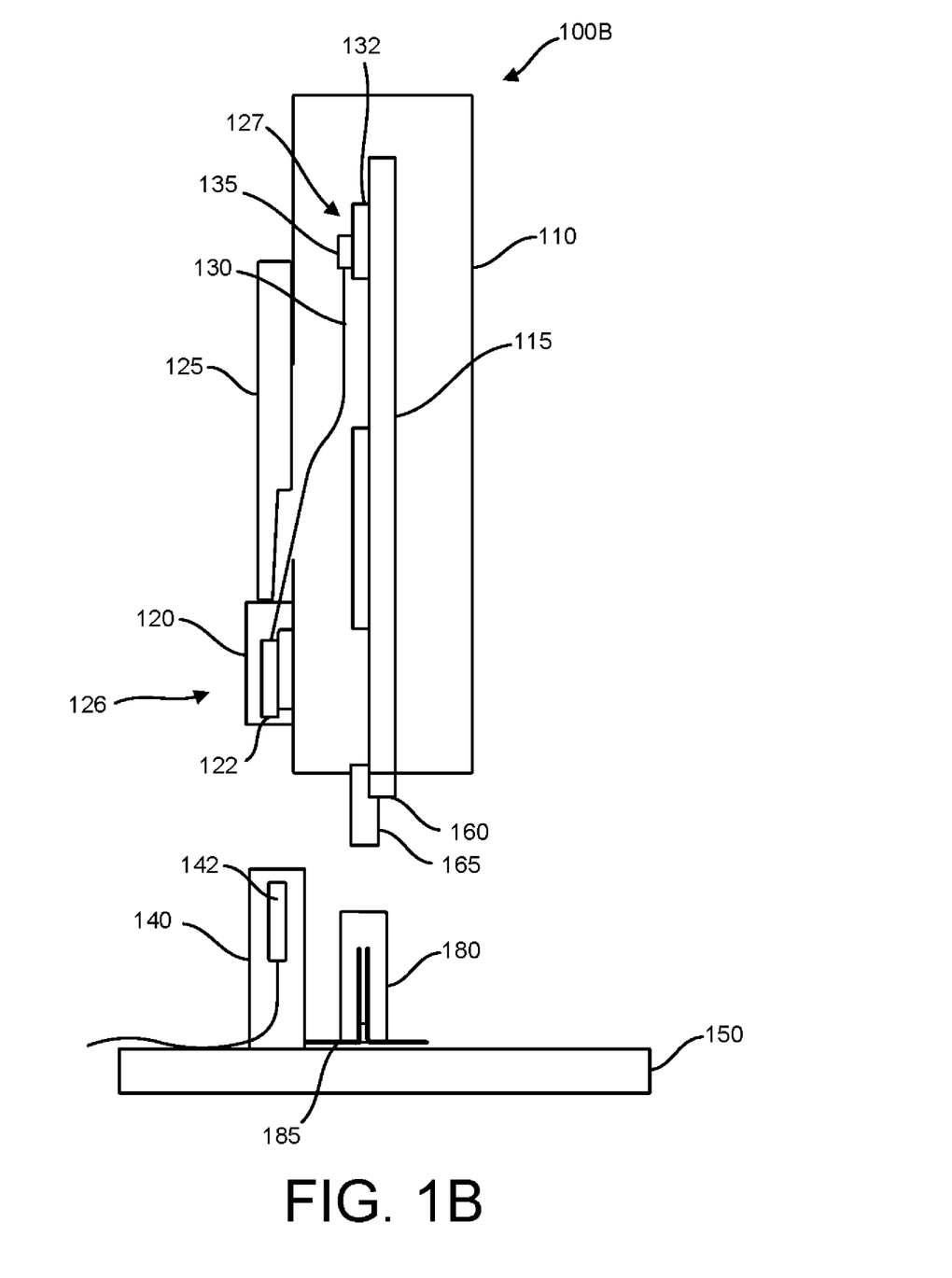
FIG. 1B is a side view of a system with a connector assembly including an optical jumper providing optical connectivity and a printed circuit board right angle connector providing electrical connectivity according to one or more examples of the disclosure.

FIGS. 1A and 1B are side views of systems with connector assemblies providing optical connectivity and electrical connectivity according to one or more examples of the disclosure. Each of the systems 100A in FIG. 1A and 100B in FIG. 1B comprises a removable device including at least a housing 110 and a printed circuit board 115 and a system board 150. In the system 100A shown in FIG. 1A and the system 100B shown in FIG. 1B, an optical jumper provides optical connectivity. The optical jumper includes an optical fiber 130 that is accessible via a cover 125 that is part of the housing 110. The cover 125 covers a portion of the optical fiber 130 that is inserted into an opening in the housing 110. The housing 110 partially covers a printed circuit board 115. The printed circuit board 115 includes an electrical edge finger contact 160 extending outside the housing 110.

The examples of FIGS. 1A and 1B include electrical edge finger contacts 160 as described above. However, not all examples of the subject matter claimed below are limited to the use of electrical edge finger contacts. Alternative examples may instead use, without limitation, different electrical connector types such as edge finger contacts, and right-angle electrical connectors. Thus, in alternative examples, the electrical edge finger contacts 160 may instead be implemented as, for example, right angle electrical contacts.

As shown in FIGS. 1A and 1B, the optical fiber 130 has a first optical connector 120 at a first end 126 and a second optical connector 135 at a second end 127. The first optical connector 120 at the first end 126 of the optical fiber 130 is removably attached to the housing 110. The second optical connector 135 on the second end 127 of the optical fiber 130 mates with an opto-electronic chip 132 on the printed circuit board 115. The printed circuit board 115 is mated to the system board 150.

Both the systems shown in FIGS. 1A and 1B include a base optical connector 140 on a system board 150. The system 100A shown in FIG. 1A also includes a slot connector type base electrical connector 170 including electrical contact beams 175 to mate with the edge finger contacts of the printed circuit board 115 of a removable device. Similarly, the system 100B shown in FIG. 1B includes a pin-and-socket type base electrical connector 180 in vertical orientation including electrical contact pins 185. The base optical connector 140 may be removably attached to the base electrical connectors 170 or 180 via a bracket (not shown). This is described in more detail below with reference to FIGS. 7A-7C.

In both the systems 100A and 100B, the first optical connector 120 includes an optical ferrule 122. The base optical connector 140 also includes an optical ferrule 142. In the system 100A shown in FIG. 1A, the first optical connector 120 is positioned so as to blind mate with the base optical connector 140 on the system board 150 when the electrical edge finger contacts 160 of the printed circuit board 115 come into contact with the electrical contacts 175 of the base electrical connector 170. Similarly, in the system 100B shown in FIG. 1B, the first optical connector 120 is positioned so as to blind mate with the base optical connector 140 on the system board 150 when the electrical contact 165 of the right-angle connector housing mounted on the printed circuit board 115 comes into contact with the electrical contacts 185 of the base electrical connector 180 mounted on the system board. In this manner, the connector assemblies shown in FIGS. 1A and 1B provide optical connectivity and electrical connectivity between the components on the system board 150 and the components on the printed circuit board 115. Optical connectivity with other optical connectors within the system may also be achieved in this manner.

In the systems shown in FIGS. 1A and 1B, the first optical connector 120 is depicted as being removably attached to an external surface of the housing 110. However, the first optical connector 120 may, instead, be removably attached to an internal surface of the housing 110 or may "straddle" the surface of the housing 110. Also, while only one first optical connector 120, one set of optical fibers 130, and one base optical connector 140 are visible in the side views of FIGS. 1A and 1B, there may be any number of optical fibers having corresponding first optical connectors and corresponding base optical connectors. Those in the art having the benefit of this disclosure will appreciate that, while the set of optical fibers 130 may include only a single optical fiber, most applications will include multiple optical fibers in the set of optical fibers 130.

Figure 1C:
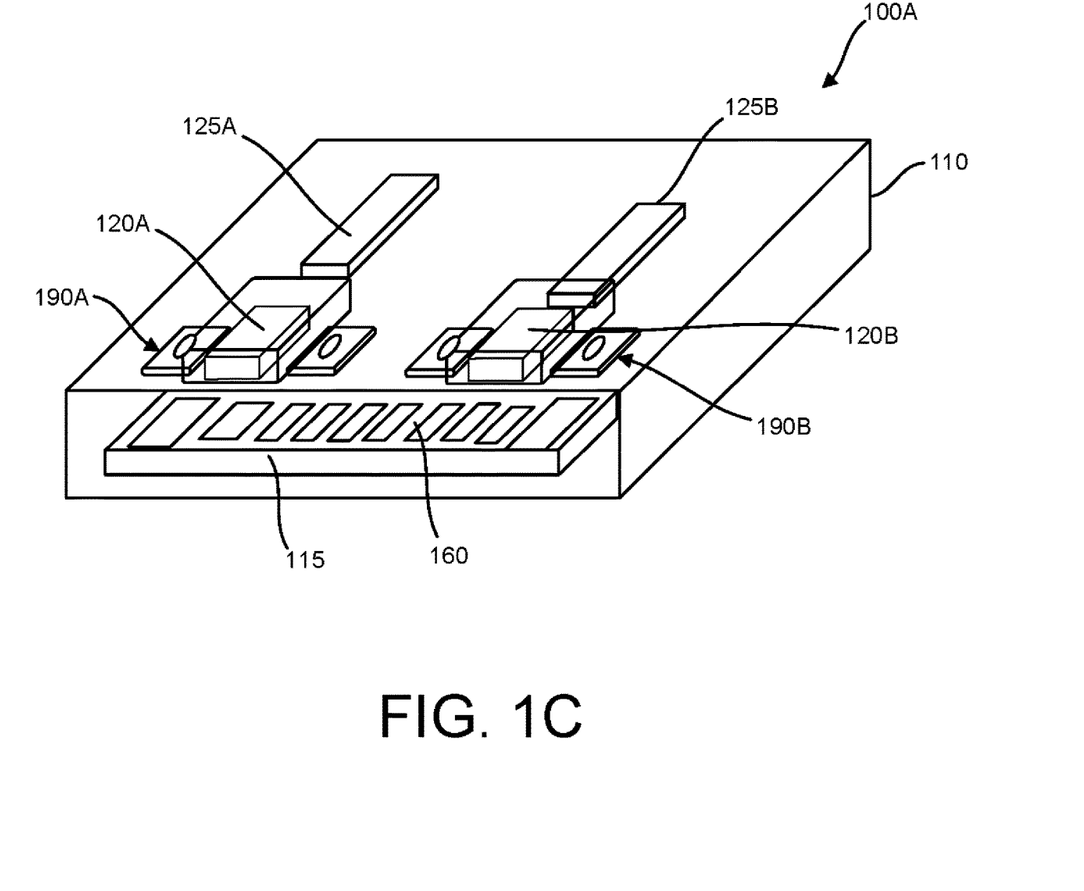
FIG. 1C is a perspective view of a system with a connector assembly including optical jumpers providing optical connectivity according to one or more examples of the disclosure.

FIG. 1C is a perspective view of a system 100A with a connector assembly including optical jumpers providing optical connectivity according to one or more examples of the disclosure. In FIG. 1C, a system 100A as shown and described above with a connector assembly including first optical connectors 120A and 120B removably attached to a housing 110 is shown. Also shown are covers 125A and 125B by which optical fibers (not shown in FIG. 1C), such as the optical fiber 130 (shown in FIG. 1A) may be accessible as described above. As can be seen from FIG. 1C, the first optical connectors 120A and 120B may be removably attached to the housing 110 via brackets 190A and 190B, respectively. The brackets 190A and 190B may be attached to the housing 110 with movable feature, such as elongated mounting holes. As such, the first optical connectors 120A and 1206 may be considered to be "floating" with respect to the printed circuit board 115. Also shown in FIG. 1C are a printed circuit board 115 with edge finger electrical contacts 160. Other details of the system 100A including the connector assembly shown in FIG. 1A are omitted for the sake of simplifying the illustration.

The brackets 190A, 190B are one mechanism by which the first optical connectors 120A, 1206 may be removably attached. The brackets 190A, 190B are, in this particular example, fastened to the housing 110. Other mechanisms may be used in addition to, or in lieu of, the brackets 190A, 190B. In other examples, the first optical connectors 120A, 1206, may be removably attached to the housing 110 using brackets (not shown) that attach to the housing 110 through a snap fit or a friction fit in conjunction with cooperating features manufactured in the housing 110. In other examples, the first optical connectors 120A, 120B may be manufactured so that they may be fastened directly to the housing 110. They might be fabricated with flanges having holes through which fasteners may be fastened directly to the housing 110. These and other means, as well structural equivalents thereof that perform this function may be used in other implementations.

Figure 2:
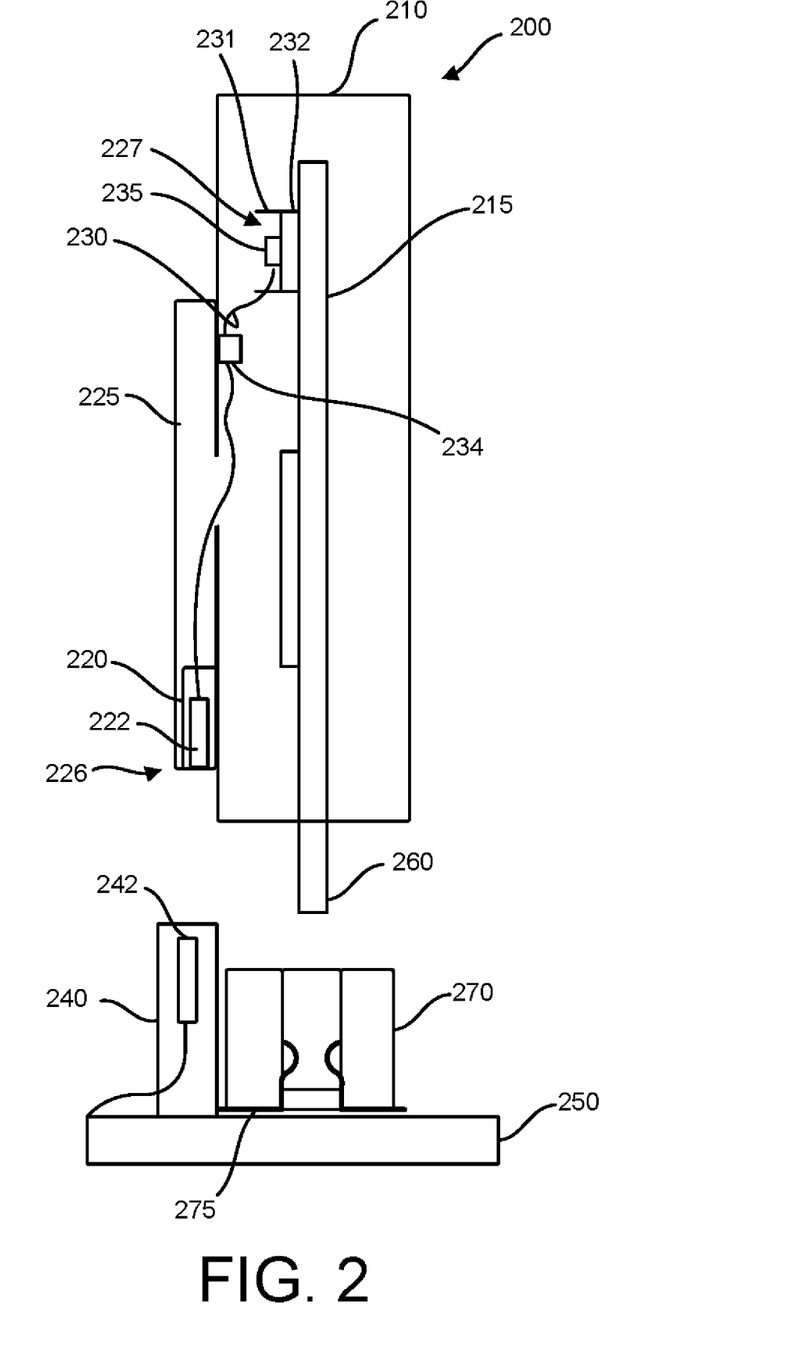
FIG. 2 is a side view of a system with a connector assembly including an optical fiber shuffle providing optical connectivity according to one or more examples of the disclosure.

FIG. 2 is a side view of a system 200 with a connector assembly including an optical fiber shuffle 234 (shown in detail, for example, as an optical fiber shuffle 350 in FIGS. 3A-3D) for providing optical connectivity according to one or more examples of the disclosure. The optical fiber shuffle includes a plurality of optical fibers, one of which is shown as an optical fiber 230 in FIG. 2. The plurality of optical fibers and the fiber shuffle 234 are accessible via a cover 225 that is part of the housing 210. The housing 210 partially covers a printed circuit board 215, exposing the edge finger contacts 260.

Each optical fiber 230 in the optical fiber shuffle 234 has a first optical connector 220 at a first end 226 and a second optical connector 235 at a second end 227. The first optical connector 220 at the first end 226 of the optical fiber 230 is removably attached to the housing 210. The second optical connector 235 at the second end 227 of the optical fiber 230 mates with a chip socket optical connector 231 that may be disposed on an opto-electronic chip 232 which in turn is disposed on the printed circuit board 215. Using the optical fiber shuffle 234, the attachment of the first optical connector 220 at the first end 226 of the optical fiber 230 and the mating of the second optical connector 235 at the second end 227 of the optical fiber 230 may be managed. This may be understood, for example, with reference to FIG. 3A, which is described in detail below The system 200 shown in FIG. 2 also includes a base optical connector 240 and a base electrical connector 270 on a system board 250. The base electrical connector 270 includes vertical electrical beam contacts 275 to accept edge contacts 260 of the printed circuit board 215 of the pluggable module 200.

The first optical connector 220 includes an optical ferrule 222. The base optical connector 240 also includes an optical ferrule 242. The first optical connector 220 is positioned so as to blind mate with the base optical connector 240 on the system board 250 when the electrical edge finger contacts 260 of the printed circuit board 215 extending outside the housing 210 comes into contact with the vertical electrical beam contacts 275 of the base electrical connector 270. In this manner, the connector assembly shown in FIG. 2 provides optical connectivity and electrical connectivity between the system board 250 and the printed circuit board 215.

In the system shown in FIG. 2, the first optical connector 220 is depicted as being removably attached to an external surface of the housing 210. However, the first optical connector 220 may, instead, be attached to an internal surface of the housing 210 or may "straddle" the surface of the housing 210. Also, while only one first optical connector 220, one optical fiber 230, and one base optical connector 240 are visible in the side view of FIG. 2, there may be any number of optical fiber shuffle assemblies 234 having corresponding optical fibers and corresponding first optical connectors that mate with corresponding base optical connectors. Further, instead of the electrical edge finger contacts 260 and vertical beam contacts 275, right-angle beam electrical contacts may be used.

Figures 3A, 3B:
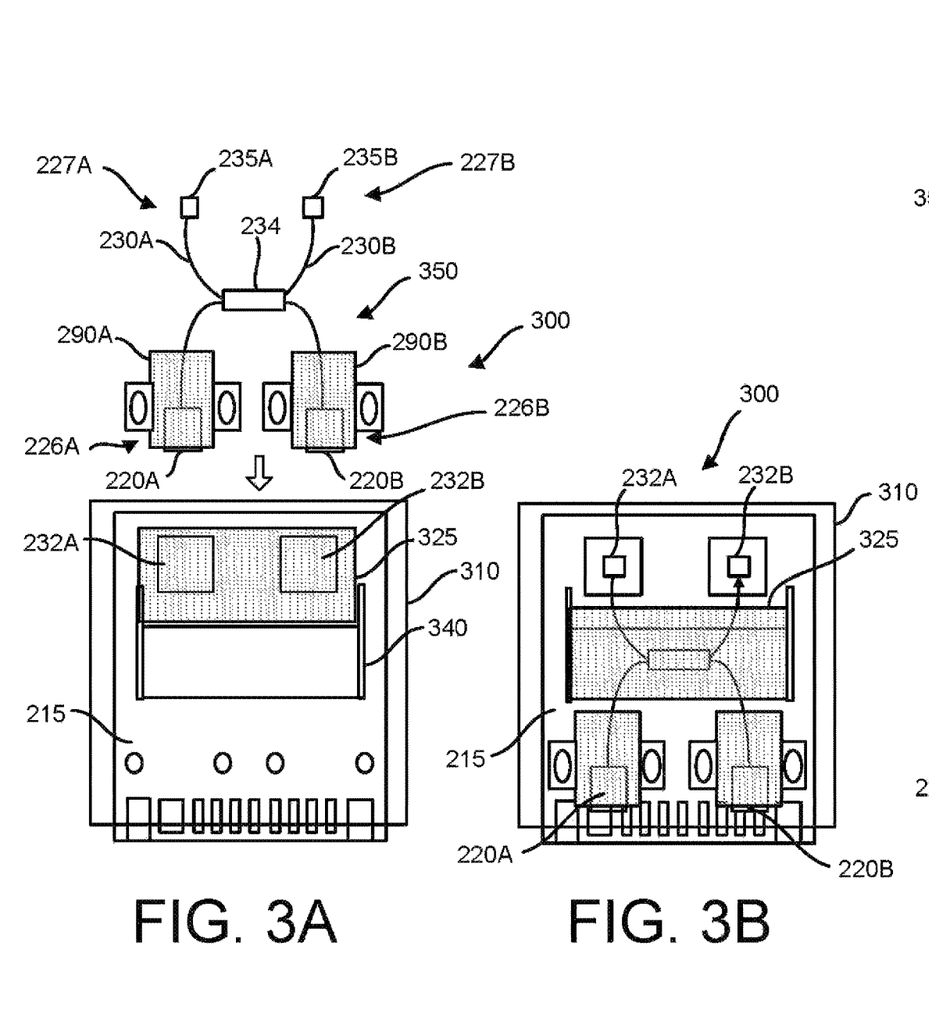
FIGS. 3A and 3B are top views of a system with a connector assembly including a housing with an adjustable cover for an optical fiber shuffle providing optical connectivity according to one or more examples of the disclosure.

FIGS. 3A and 3B are top views of a system with a connector assembly including a housing with an adjustable cover for an optical fiber shuffle providing optical connectivity according to one or more examples of the disclosure. As shown in FIG. 3A, an optical fiber shuffle 350 includes optical fibers 230A and 230B having respective first ends 226A and 226B and respective second ends 227A and 227B, along with an optical fiber shuffle 234. The optical fiber shuffle 234 manages the attachment of respective first optical connectors 220A and 220B at the respective first ends 226A and 226B to the housing 310 for blind mating with respective base optical connectors (not shown). The optical fiber shuffle 234 also manages the mating of the second optical connectors 235A and 235B at the respective second ends 227A and 227B with respective printed circuit board optical connectors 232A and 232B.

For example, the optical fiber shuffle 234 may guide the optical fiber 230A such that a first optical connector 220B at a first end 226B of the optical fiber 230A is removably attached to the housing 310 via a bracket 290B, and a second optical connector 235A at a second end 227A of the optical fiber 230A mates with a printed circuit board optical connector 232A. Similarly, the optical fiber shuffle 234 may guide the optical fiber 230B such that a first optical connector 220A at a first end 226A of the optical fiber 230B is removably attached to the housing 310 via a bracket 290A, and a second optical connector 235B at a second end 227B of the optical fiber 230B mates with a printed circuit board optical connector 232B. The brackets 290A and 290B serve to make the respective first optical connectors 220A and 220B "floating" with respect to the printed circuit board 215. Although not shown, base optical connectors, such as the base optical connector 240 shown in FIG. 2, may be fixed with respect to the system board 250.

As shown in FIGS. 3A and 3B, a housing 310 includes a portion 310 that has an opening 340 to receive a portion of the optical fiber shuffle 350, namely the optical fiber shuffle 234, the second ends of the optical fibers 230A and 230B, and the second optical connectors 235A and 2358. The housing 310 also includes an adjustable cover 325 that may be attached to cover the opening 340 via, for example, slidable tracts.

Figure 3C:
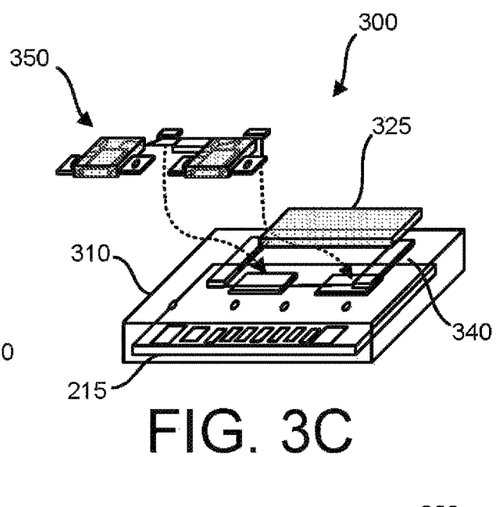
FIGS. 3C and 3D are perspective views of a system with a connector assembly including a housing with an adjustable cover for an optical fiber shuffle providing optical connectivity according to one or more examples of the disclosure.
Figure 3D:
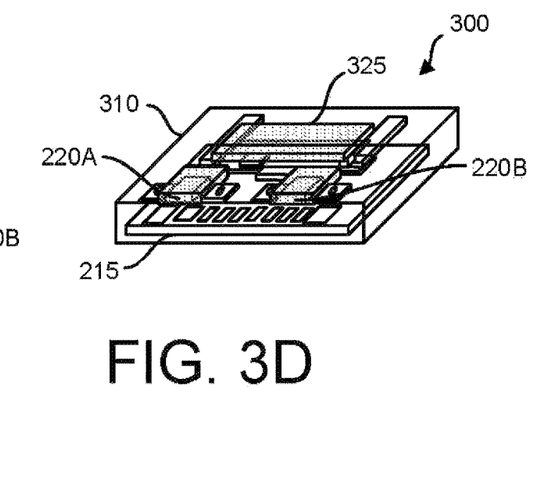

As can be seen from the perspective view in FIG. 3C, the adjustable cover 325 may be adjusted to allow the optical fiber shuffle 234, the respective second ends 227A and 227B of the optical fibers 230A and 230B, and the second optical connectors 235A and 235B to be inserted through the opening 340, such that the second optical connectors 235A and 235B can mate with the printed circuit board connectors 232A and 232B. As can be seen from the perspective view in FIG. 3D, the adjustable cover 325 may then be adjusted to cover the optical fiber shuffle 234, the respective second ends 227A and 227B of optical fibers 230A and 230B, and the second optical connectors 235A and 235B.

While an optical fiber shuffle 350 is also depicted in FIGS. 4A-6B, some details of the optical fiber shuffle 350 are omitted from these figures for the sake of simplicity of illustration.

Figures 4A, 4B, 4C:
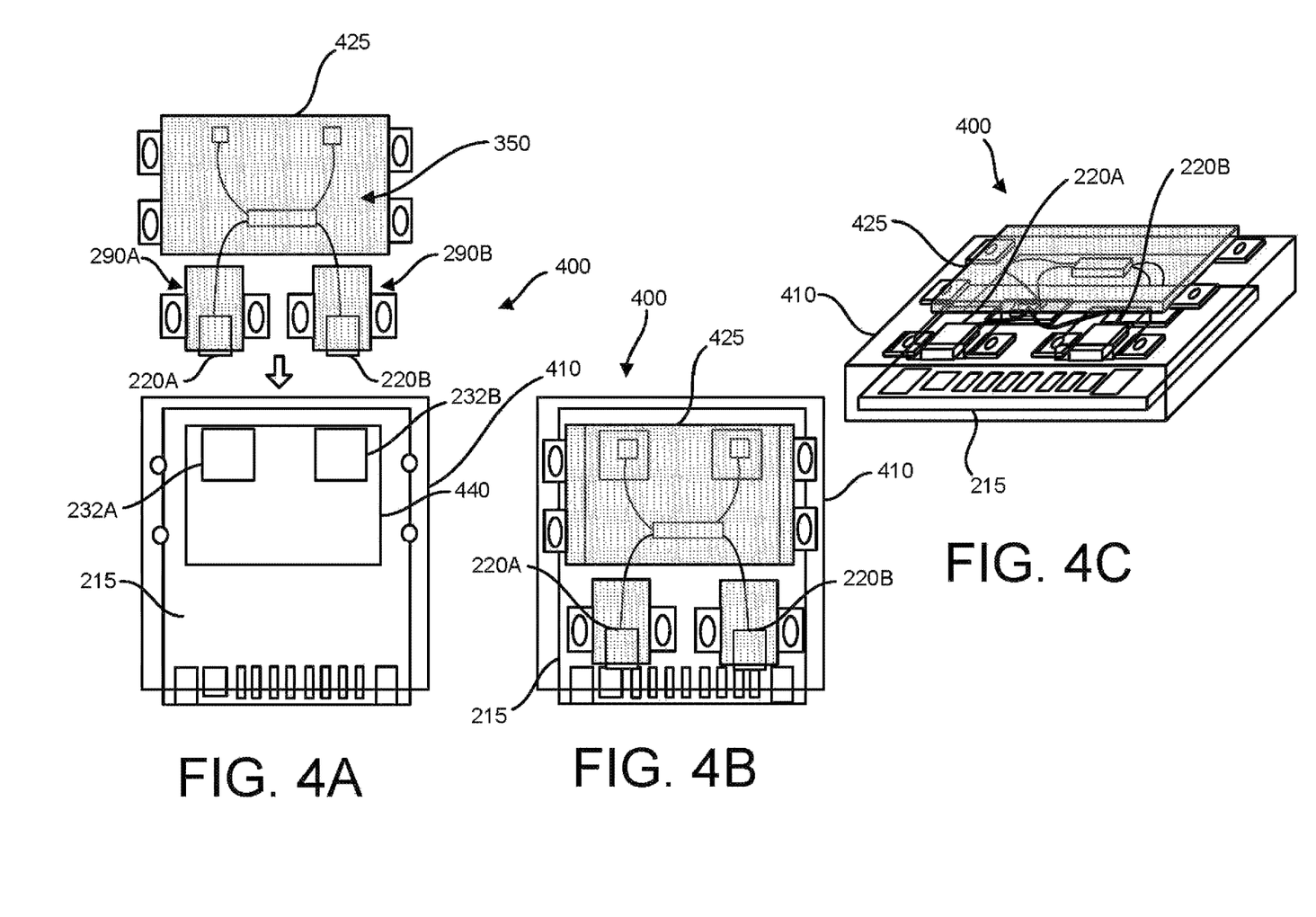
FIGS. 4A and 4B are top views of a system with a connector assembly including a housing with a fixed cover for an optical fiber shuffle including floating optical connectors according to one or more examples of the disclosure.
FIG. 4C is a perspective view of a system with a connector assembly including a housing with a fixed cover for an optical fiber shuffle including floating optical connectors according to one or more examples of the disclosure.

FIGS. 4A and 4B are top views of a system 400 with a connector assembly including a housing with a fixed cover for an optical fiber shuffle including floating optical connectors according to one or more examples of the disclosure. As shown in FIGS. 4A and 4B, a housing 410 includes an opening 440 to receive a portion of the optical fiber shuffle 350, namely the optical fiber shuffle 234, the respective second ends 227A and 227B of optical fibers 230A and 230B, and the second optical connectors 235A and 235B shown in FIG. 3A. The housing 410 also includes a fixed cover 425 that can be used to cover the portion of the optical fiber shuffle 350 inserted in the opening 440.

As can be seen from the perspective view depicted in FIG. 4C, once the optical fiber shuffle 234, the respective second ends 227A and 227B of optical fibers 230A and 230B, and the second optical connectors 235A and 235B are inserted through the opening 440, such the second optical connectors 235A and 235B can mate with the printed circuit board connectors 232A and 232B, the fixed cover 425 may be attached over the opening 440. Thus, the fixed cover 425 effectively forms a part of the housing 410 for present purposes. The fixed cover 425 may be attached to the housing 410 via, for example, bolts or brackets. Once attached, the fixed cover 425 covers a portion of the optical fiber shuffle 350 including the optical fiber shuffle 234, the respective second ends 227A and 227B of optical fibers 230A and 230B, and the second optical connectors 235A and 235B.

Similar to the systems shown in FIGS. 3A-3D, the respective first optical connectors 220A and 220B may be attached to the housing 410 via brackets 290A and 290B, respectively. The brackets 290A and 290B serve to make the respective first optical connectors 220A and 220B "floating" with respect to the printed circuit board 215. Although not shown, the base optical connectors, such as the base optical connector 240 shown in FIG. 2, may be fixed with respect to the system board 250.

Figures 5A, 5B, 5C:
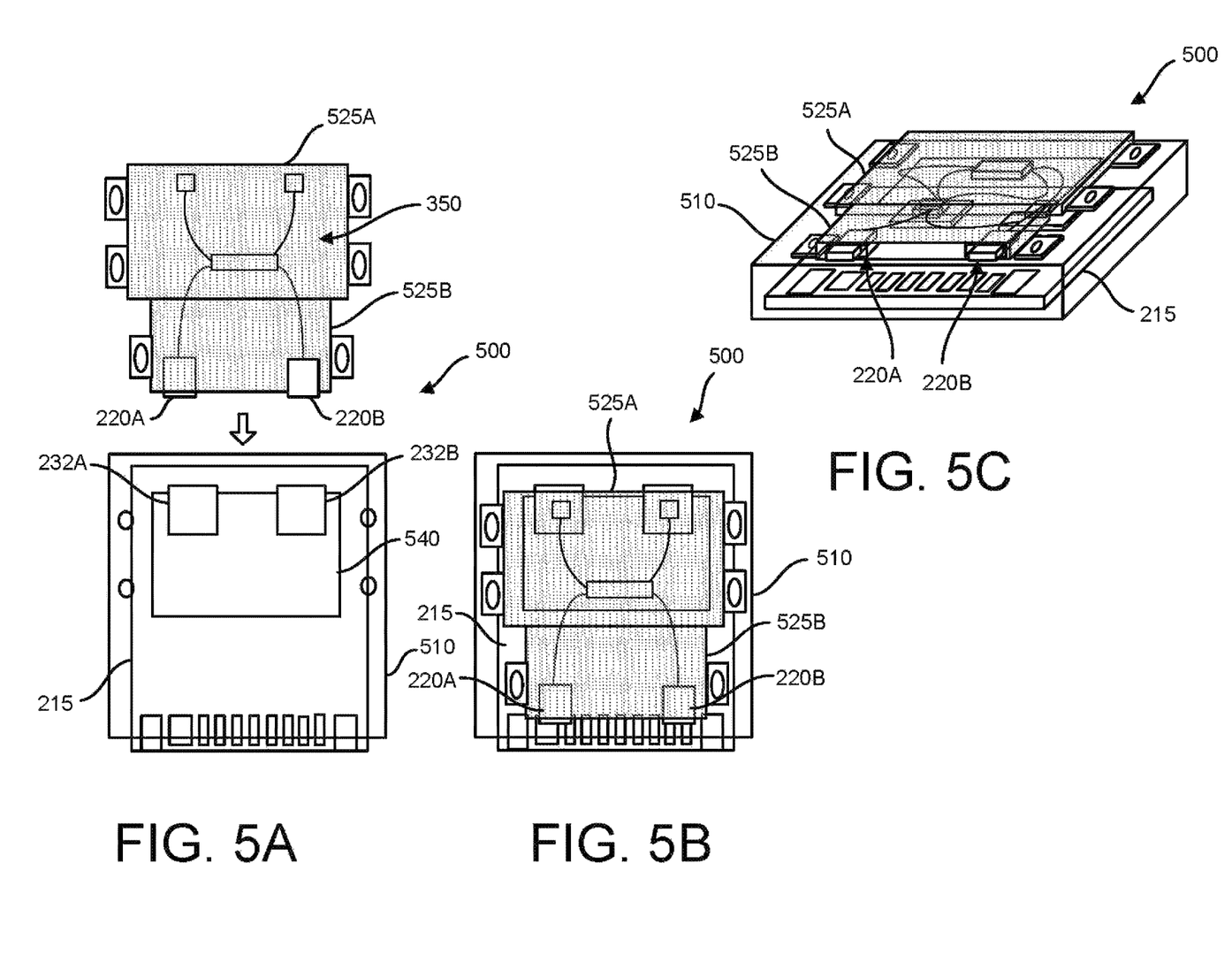
FIGS. 5A and 5B are top views of a system with a connector assembly including a housing with a fixed cover for an optical fiber shuffle including fixed optical connectors according to one or more examples of the disclosure.
FIG. 5C is a perspective view of a system with a connector assembly including a housing with a fixed cover for an optical fiber shuffle including fixed optical connectors according to one or more examples of the disclosure.

FIGS. 5A and 5B are top views of a system 500 with a connector assembly including a housing with a fixed cover for an optical fiber shuffle including fixed optical connectors according to one or more examples of the disclosure. As shown in FIGS. 5A and 5B, a housing 510 includes an opening 540 to receive a portion of the optical fiber shuffle 350, namely the optical fiber shuffle 234, the respective second ends 227A and 227B of optical fibers 230A and 230B, and the second optical connectors 235A and 235B shown in FIG. 3A. The housing 510 also includes a fixed cover including fixed cover portions 525A and 525B that can be used to cover portions of the optical fiber shuffle 350, including a portion inserted in the opening 540.

As can be seen from the perspective view depicted in FIG. 5C, once the optical fiber shuffle 234, the respective second ends 227A and 227B of the optical fibers 230A and 230B, and the second optical connectors 235A and 235B are inserted through the opening 540, such that the second optical connectors 235A and 235B can mate with the printed circuit board connectors 232A and 232B, respectively, the fixed cover portion 525A may be attached over the opening 540 using, for example, bolts. Once attached, the fixed cover portion 525A covers a portion of the optical fiber shuffle 350 including the optical fiber shuffle 234, the second ends of the optical fibers 230A and 230B, and the second optical connectors 235A and 235B, effectively becoming a part of the housing 510 for present purposes.

Additionally, the fixed cover portion 525B can be attached to the housing 510, over a portion of the optical fiber shuffle 350 including the respective first optical connectors 220A and 220B, via for example, bolts. In this example, the respective first optical connectors 220A and 220B may be mounted on the underside of the fixed cover portion 525B or may be mounted on the top surface of the housing 510. In either case, when the portion 525B is attached to the housing 510, effectively becoming a part of the housing 510 for present purposes, the respective first optical connectors 220A and 220B are considered removably attached to the housing 510. The fixed cover portion 525B serves to make the respective first optical connectors 220A and 220B fixed with respect to the printed circuit board 215. Although not shown, the base optical connectors, such as the base optical connector 240 shown in FIG. 2, may be floating with respect to the system board 250.

Figure 6A:
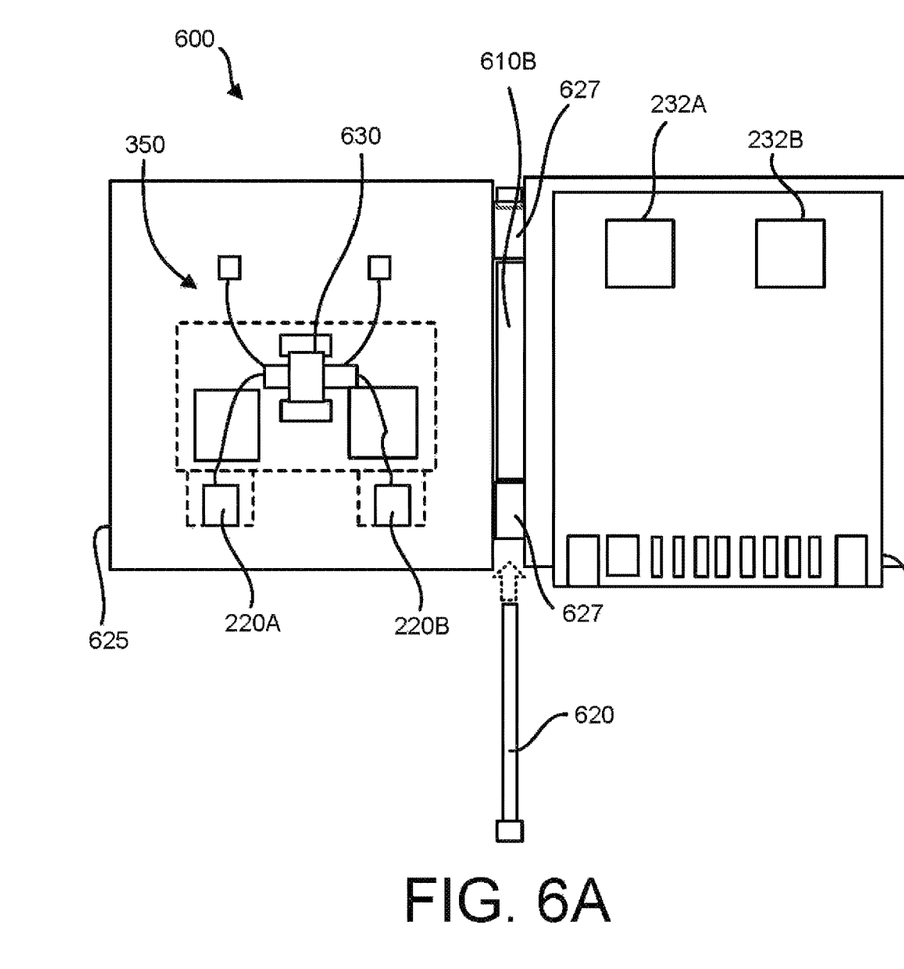
FIGS. 6A and 6B are top views of a system with a connector assembly including a housing with a hinged portion for an optical fiber shuffle according to one or more examples of the disclosure.

FIGS. 6A and 6B are top views of a system 600 including a housing with a hinged portion for an optical fiber shuffle according to one or more examples of the disclosure. As shown in FIG. 6A, a housing includes a portion 610A covering a bottom of the printed circuit board 215. The housing also includes a portion 610B and a hinged portion 625. The hinged portion 625 may be attached to the portion 610B by inserting a hinge pin 620 into aligned hinge elements 627. As indicated by the dashed lines in FIG. 6A, the respective first optical connectors 220A and 220B may be removably attached to a "top" surface of the hinged portion 625. The second optical connectors 235A and 235B and the optical fiber shuffle 234 (shown in FIG. 3A) may be held in place on underside of the hinged portion 625 via a retention feature 630.

Figure 6B:
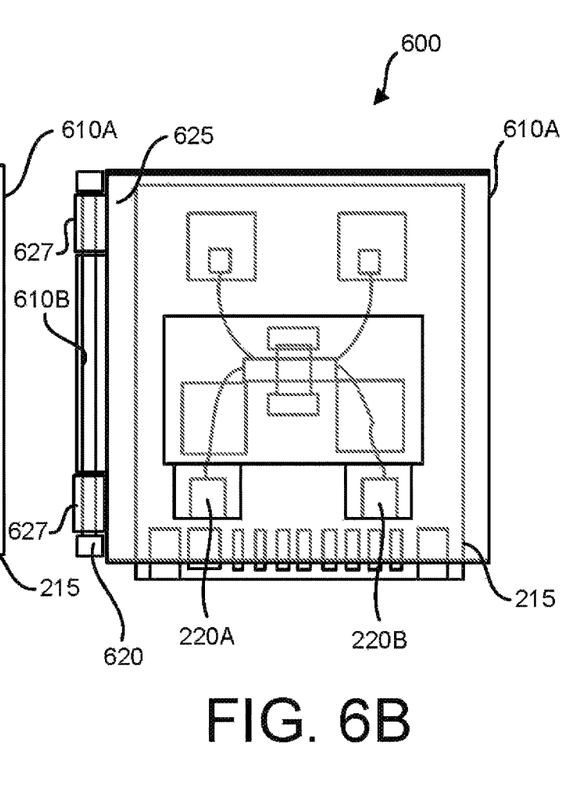

As shown in FIG. 6B, the optical fiber shuffle 350 is positioned such that when the hinged portion 625 is shut over the printed circuit board 215, the second optical connectors 235A and 235B mate with the printed circuit board connectors 232A and 232B.

The respective first optical connectors 220A and 220B may be removably attached to the "top" surface of the hinged portion 625 via brackets (not shown) such that the respective first optical connectors 220A and 220B are floating with respect to the printed circuit board 215. Although not shown, the base optical connectors, such as the base optical connector 240 shown in FIG. 2, may be floating with respect to the system board 250.

Figures 7A, 7B:
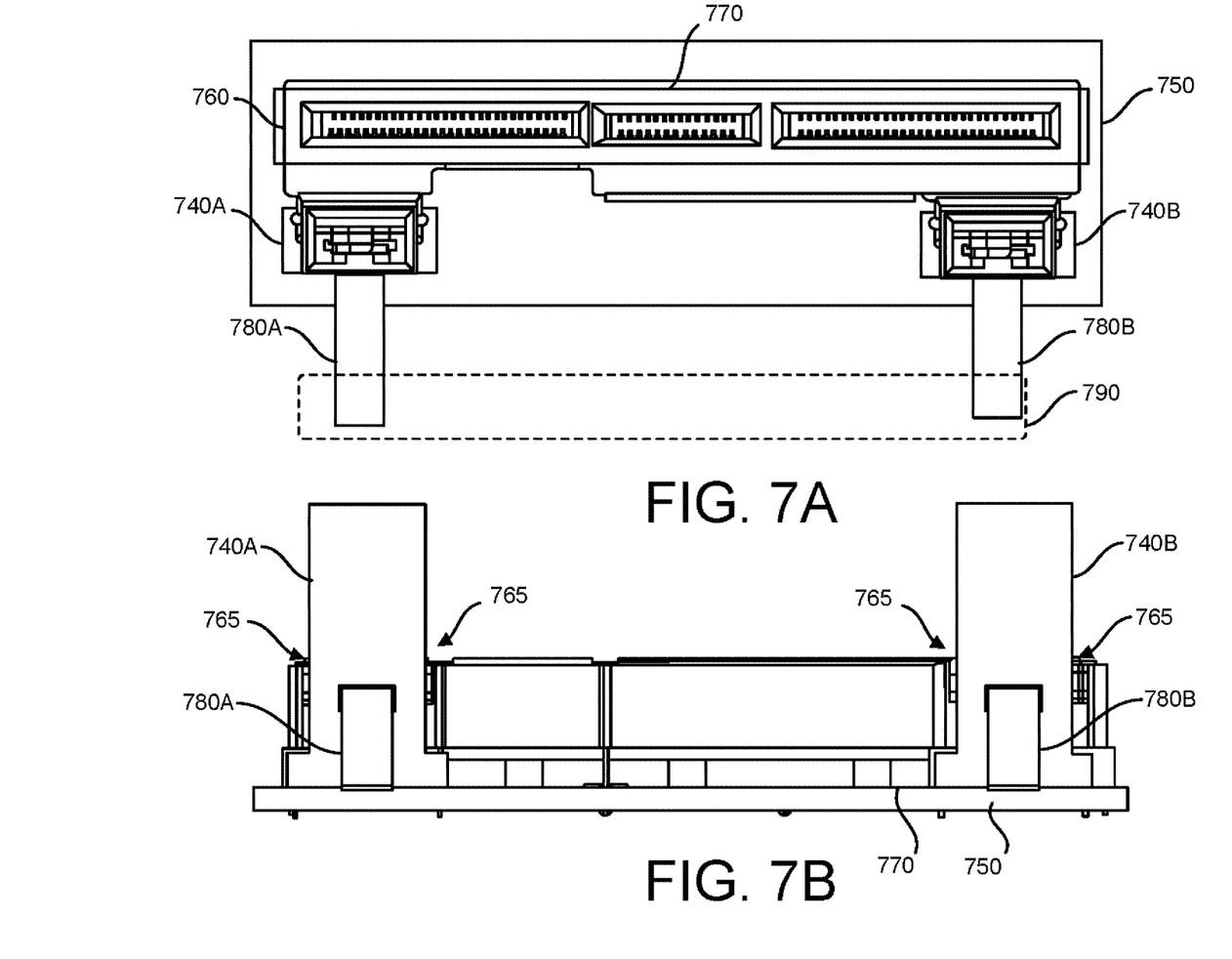
FIG. 7A is a top view of a system board with an attachable base optical connector that may be used with any of the systems shown in FIGS. 1-6B according to one or more examples of the disclosure.
FIG. 7B is a side view of a system board with an attachable base optical connector that may be used with any of the system shown in FIGS. 1-6B according to one or more examples of the disclosure.

FIG. 7A is a top view of a system board with an attachable base optical connector that may be used with any of the systems shown in FIGS. 1-6B according to one or more examples of the disclosure. As shown in FIG. 7A, a base electrical connector 770 is mounted on a system board 750. A base bracket 760 is mounted to the system board 750, around and connected to the base electrical connector 770. Base optical connectors 740A and 740B are attached to the base bracket 760.

Figure 7C:
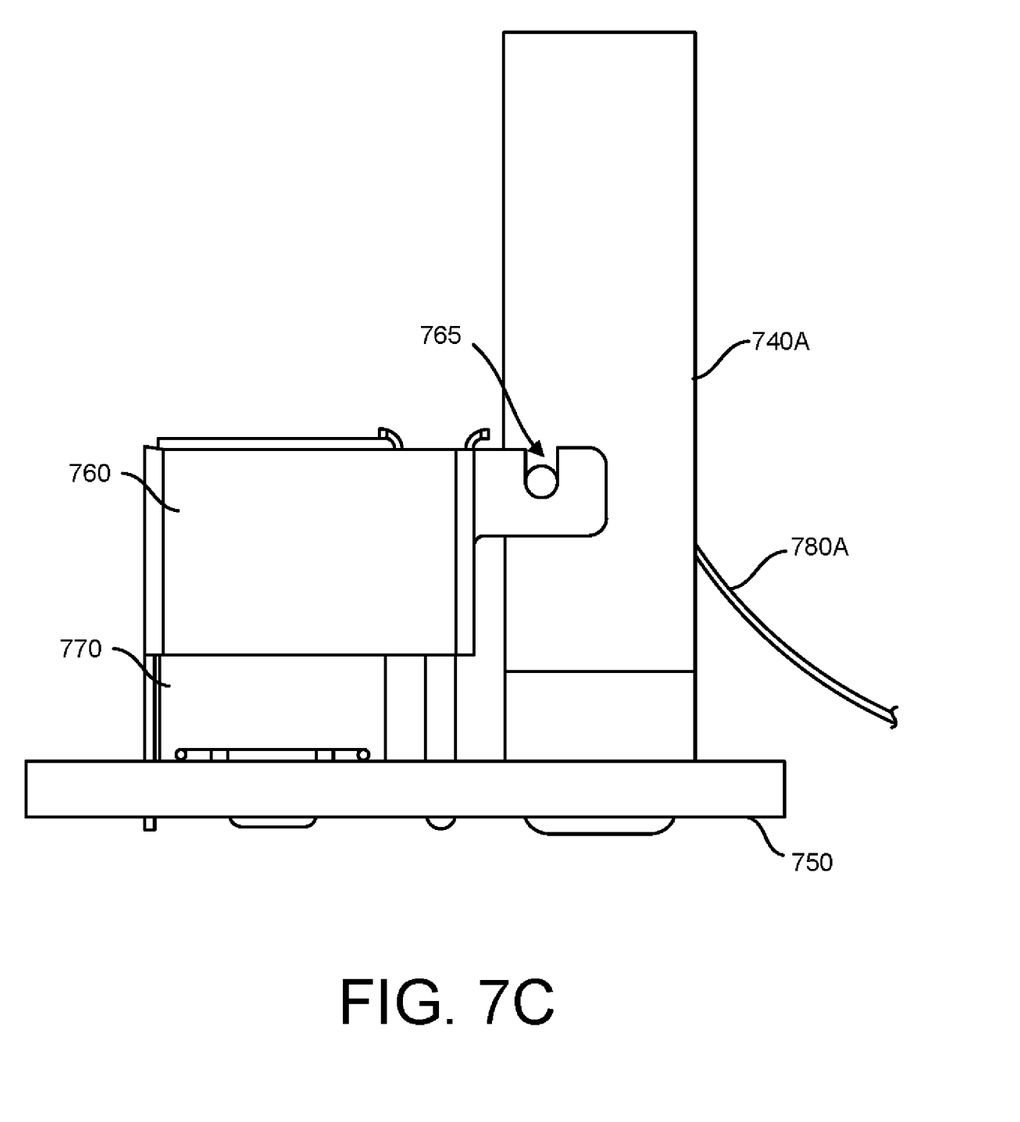
FIG. 7C is a front view of a system board with an attachable base optical connector that may be used with any of the systems shown in FIGS. 1-6B according to one or more examples of the disclosure.

As can be seen from the side and front views shown in FIGS. 7B and 7C, the base optical connectors 740A and 740B may be modularly attached to the base bracket 760 via connectors 765. In this manner, the base optical connectors 740A and 740B may be removably attached to the base electrical connector 770 via the base bracket 760. Optical fibers 780A and 780B extend from the base optical connectors 740A and 740B, respectively, for connection to one or more system components 790.

Figure 8:
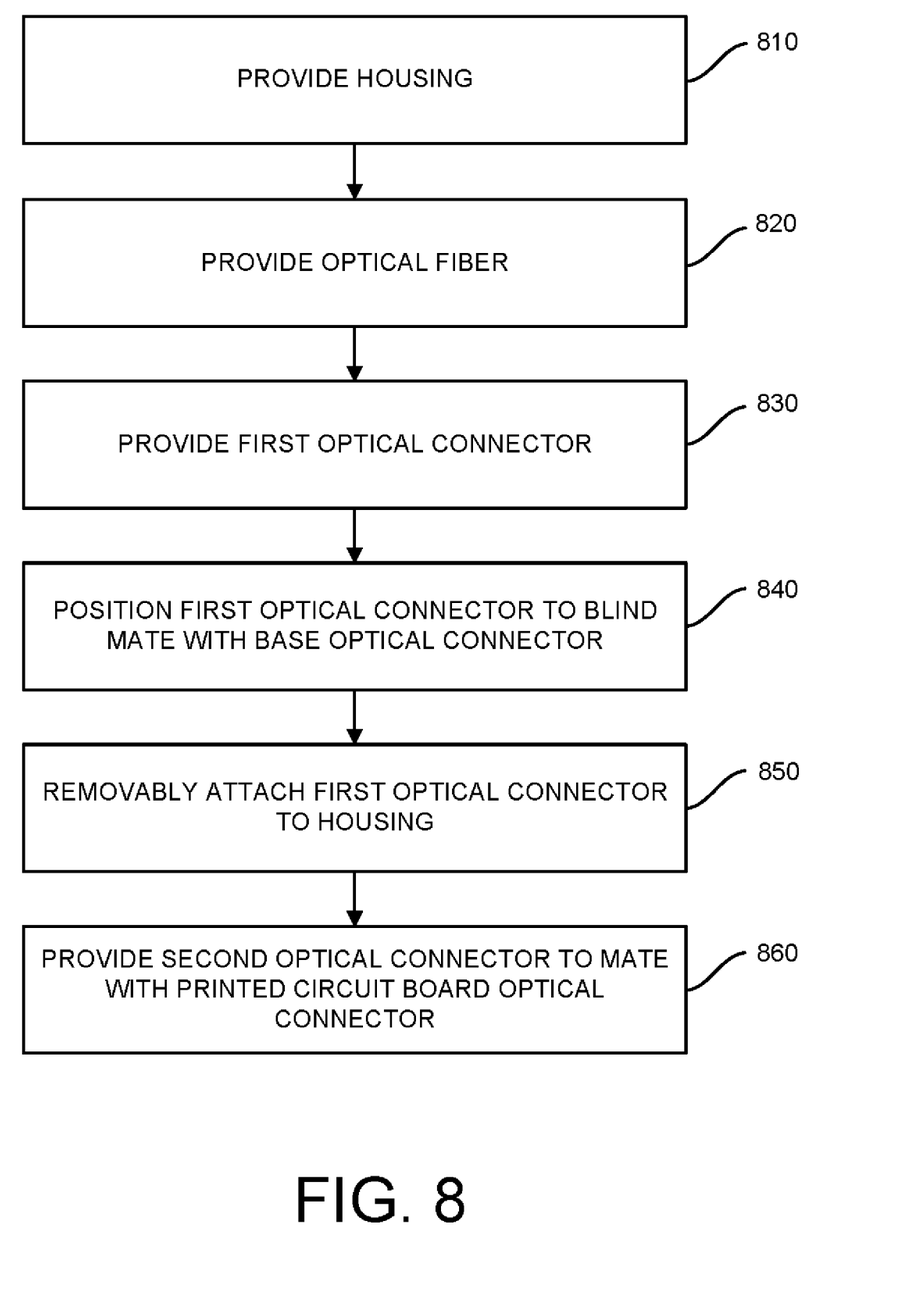
FIG. 8 is a flowchart depicting a method for forming a connector assembly according to one or more examples of the disclosure.

FIG. 8 is a flowchart depicting a process for forming a connector assembly according to one or more examples of the disclosure. The process 800 provides (at 810) a housing to cover at least a portion of a printed circuit board. An optical fiber is provided (at 820) having a first end and a second end. A first optical connector is provided (at 830) at a first end of the optical fiber. The first optical connector is positioned (at 840) to blind mate with a base optical connector. The first optical connector is removably attached (at 850) to the housing. A second optical connector is provided (at 860) at the second end of the optical fiber to mate with a printed circuit board optical connector on the printed circuit board.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A connector assembly, comprising:
   a housing that, in use, covers at least a portion of a printed circuit board, wherein the printed circuit board comprises an electrical connector extending outside the housing;
   an optical fiber having a first end and a second end;
   a first optical connector at the first end of the optical fiber that is removably attachable to the housing when in use; and
   a second optical connector at the second end of the optical fiber that in use mates with an opto-electronic chip disposed on the printed circuit board; and
   wherein the first optical connector and the electrical connector are positioned such that, when the connector assembly is coupled to a system board comprising a base optical connector and a base electrical connector, the first optical connector blind mates with the base optical connector and the electrical connector blind mates with the base electrical connector.

2. The connector assembly of claim 1, further comprising an optical fiber shuffle including a plurality of optical fibers having respective first optical connectors at respective first ends and respective second optical connectors at respective second ends, wherein the respective first optical connectors are removably attachable to the housing when in use and positioned when attached to the housing so as to blind mate with respective base optical connectors on the system board, and wherein the respective second optical connectors, in use, mate with respective printed circuit board optical connectors.

3. The connector assembly of claim 2, wherein the housing includes an opening to receive a portion of the optical fiber shuffle and an adjustable cover that, in use, covers the portion of the optical fiber shuffle inserted into the opening.

4. The connector assembly of claim 2, wherein the housing includes an opening to receive at least a portion of the optical fiber shuffle and a fixed cover that, in use, covers at least the portion of the optical fiber shuffle inserted into the opening.

5. The connector assembly of claim 1, wherein the housing includes an opening to receive a portion of the optical fiber and a fixed cover that, in use, covers the portion of the optical fiber inserted into the opening.

6. The connector assembly of claim 2, wherein the housing includes a hinged portion to which the respective first optical connectors are removably attachable.

7. A method, comprising:
   providing a housing to cover at least a portion of a printed circuit board, wherein the printed circuit board comprises an electrical connector extending outside the housing;
   providing an optical fiber having a first end and a second end;
   providing a first optical connector on the first end of the optical fiber;
   providing a second optical connector on the second end of the optical fiber to mate with an optical connector on the printed circuit board;
   removably attaching the first optical connector to the housing; and
   positioning the first optical connector and the electrical connector such that the first optical connector blind mates with a base optical connector on a system board and the electrical connector blind mates with a base electrical connector on the system board.

8. The method of claim 7, further comprising:
   providing an optical fiber shuffle including a plurality of optical fibers having respective first optical connectors at respective first ends and respective second optical connectors at respective second ends;
   positioning the optical fiber shuffle such that the respective first optical connectors blind mate with respective base optical connectors on the system board, and the respective second optical connectors mate with respective printed circuit board optical connectors; and
   removably attaching the respective first optical connectors to the housing.

9. The method of claim 8, further comprising:
   providing an opening in the housing to receive a portion of the optical fiber shuffle; and
   providing the housing with an adjustable cover to cover the portion of the optical fiber shuffle inserted into the opening.

10. The method of claim 8, further comprising:
    providing an opening in the housing to receive at least a portion of the optical fiber shuffle; and
    providing the housing with a fixed cover to cover at least the portion of the optical fiber shuffle inserted into the opening.

11. The method of claim 10, wherein removably attaching the respective first optical connectors to the housing includes removably attaching the respective first optical connectors to the fixed cover.

12. The method of claim 8, further comprising providing the housing with a hinged portion, wherein removably attaching the respective first optical connectors to the housing comprises removably attaching the respective first optical connectors to the hinged portion.

13. A system, comprising:
    a printed circuit board;

a housing to cover at least a portion of the printed circuit board, wherein the printed circuit board comprises an electrical connector extending outside the housing;

an optical fiber having a first end and a second end;

a first optical connector at the first end of the optical fiber that is removably attached to the housing; and a second optical connector on the second end of the optical fiber that mates with a printed circuit board optical connector on the printed circuit board;

wherein the first optical connector and the electrical connector are positioned such that, when the system is coupled to a system board comprising a base optical connector and a base electrical connector, the first optical connector blind mates with the base optical connector and the electrical connector blind mates with the base electrical connector.

14. The system of claim 13, further comprising a printed circuit board edge finger electrical connector to mate with a base electrical connector.

15. The system of claim 13, further comprising a printed circuit board right angle electrical connector to mate with a base electrical connector.

16. The system of claim 15, wherein the base optical connector is removably attached to the base electrical connector.

17. The system of claim 13, further comprising an optical fiber shuffle including a plurality of optical fibers having respective first optical connectors at respective first ends and respective second optical connectors at respective second ends, wherein the respective first optical connectors are removably attachable to the housing when in use and positioned when attached to the housing so as to blind mate with a respective base optical connectors, and wherein the respective second optical connectors, in use, mate with respective chip optical connectors on the printed circuit board.

18. The system of claim 17, wherein the housing includes an opening to receive a portion of the optical fiber shuffle and an adjustable cover that, in use, is adjustable to cover the portion of the optical fiber shuffle inserted into the opening.

19. The system of claim 17, wherein the housing includes an opening to receive at least a portion of the optical fiber shuffle and a fixed cover that, in use, covers at least the portion of the optical fiber shuffle inserted into the opening.

20. The system of claim 17, wherein the housing includes a hinged portion to which the respective first optical connectors are removably attachable.

* * * * *